(12) United States Patent
Ogauchi et al.

(10) Patent No.: US 9,562,590 B2
(45) Date of Patent: Feb. 7, 2017

(54) AUTOMATIC TRANSMISSION

(71) Applicant: Mazda Motor Corporation, Aki-gun, Hiroshima (JP)

(72) Inventors: Yasuhiro Ogauchi, Higashihiroshima (JP); Masaru Nakagishi, Hiroshima (JP); Shinya Kamada, Kure (JP); Tatsuhiko Iwasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/911,924

(22) PCT Filed: Aug. 7, 2014

(86) PCT No.: PCT/JP2014/004130
§ 371 (c)(1),
(2) Date: Feb. 12, 2016

(87) PCT Pub. No.: WO2015/045258
PCT Pub. Date: Apr. 2, 2015

(65) Prior Publication Data
US 2016/0195172 A1    Jul. 7, 2016

(30) Foreign Application Priority Data

Sep. 25, 2013   (JP) .................................. 2013-198774

(51) Int. Cl.
*F16H 3/66*   (2006.01)
(52) U.S. Cl.
CPC ......... *F16H 3/666* (2013.01); *F16H 2200/006* (2013.01); *F16H 2200/2012* (2013.01); *F16H 2200/2043* (2013.01)
(58) Field of Classification Search
None
See application file for complete search history.

(56) References Cited

U.S. PATENT DOCUMENTS

| | | | | |
|---|---|---|---|---|
| 5,885,184 A | * | 3/1999 | Park ........................ | F16H 3/666 475/280 |
| 5,941,791 A | * | 8/1999 | Park ........................ | F16H 3/666 475/284 |

(Continued)

FOREIGN PATENT DOCUMENTS

| | | |
|---|---|---|
| DE | 102004041507 A1 | 3/2006 |
| JP | 2008298126 A | 12/2008 |

(Continued)

OTHER PUBLICATIONS

ISA Japanese Patent Office, International Search Report Issued in Application No. PCT/JP2014/004130, Oct. 28, 2014, WIPO, 2 pages.

(Continued)

*Primary Examiner* — Justin Holmes
(74) *Attorney, Agent, or Firm* — Alleman Hall McCoy Russell & Tuttle LLP

(57) ABSTRACT

An automatic transmission includes: an input shaft connected to a driving source; an output shaft provided coaxially with the input shaft and connected to a differential mechanism; double pinion type first and second planetary gear sets; single pinion type third and fourth planetary gear sets; first to third clutches each configured to connect and disconnect predetermined rotational elements of the planetary gear sets to and from each other; and first and second brakes configured to connect and disconnect a predetermined rotational element of the planetary gear set to and from a transmission case. When the first to third clutches are engaged, and the first and second brakes are released, an eighth gear stage whose reduction ratio is 1 is formed.

2 Claims, 19 Drawing Sheets

(56) References Cited

U.S. PATENT DOCUMENTS

| | | | | |
|---|---|---|---|---|
| 5,944,629 A | * | 8/1999 | Park | F16H 3/666 |
| | | | | 475/279 |
| 5,980,418 A | * | 11/1999 | Park | F16H 3/666 |
| | | | | 475/275 |
| 6,039,670 A | * | 3/2000 | Park | F16H 3/666 |
| | | | | 475/275 |
| 2008/0261752 A1 | | 10/2008 | Hart et al. | |
| 2008/0305917 A1 | | 12/2008 | Phillips et al. | |
| 2009/0017963 A1 | | 1/2009 | Hart et al. | |
| 2009/0054199 A1 | | 2/2009 | Phillips et al. | |
| 2012/0178572 A1 | * | 7/2012 | Hart | F16H 3/666 |
| | | | | 475/116 |
| 2015/0051044 A1 | * | 2/2015 | Beck | F16H 3/666 |
| | | | | 475/277 |
| 2015/0252877 A1 | * | 9/2015 | Mellet | F16H 3/62 |
| | | | | 475/269 |
| 2016/0053868 A1 | * | 2/2016 | Beck | F16H 3/666 |
| | | | | 475/275 |

FOREIGN PATENT DOCUMENTS

| | | |
|---|---|---|
| JP | 2009174626 A | 8/2009 |
| JP | 2009250437 A | 10/2009 |

OTHER PUBLICATIONS

ISA Japanese Patent Office, Written Opinion Issued in Application No. PCT/JP2014/004130, Oct. 28, 2014, WIPO, 9 pages.
International Bureau of WIPO, International Preliminary Report on Patentability Issued in Application No. PCT/JP2014/004130, Oct. 28, 2014, WIPO, 10 pages.

* cited by examiner

|  | CL1 | CL2 | CL3 | BR1 | BR2 |
|---|---|---|---|---|---|
| FIRST GEAR STAGE |  | ENGAGED |  | ENGAGED | ENGAGED |
| SECOND GEAR STAGE |  | ENGAGED | ENGAGED | ENGAGED |  |
| THIRD GEAR STAGE |  |  | ENGAGED | ENGAGED | ENGAGED |
| FOURTH GEAR STAGE | ENGAGED |  | ENGAGED | ENGAGED |  |
| FIFTH GEAR STAGE | ENGAGED |  |  | ENGAGED | ENGAGED |
| SIXTH GEAR STAGE | ENGAGED |  | ENGAGED |  | ENGAGED |
| SEVENTH GEAR STAG | ENGAGED | ENGAGED |  |  | ENGAGED |
| EIGHTH GEAR STAGE | ENGAGED | ENGAGED | ENGAGED |  |  |
| REVERSE GEAR STAGE | ENGAGED | ENGAGED |  | ENGAGED |  |

Fig. 2

— FIRST GEAR STAGE —

○—○ CONSTANTLY CONNECTED
✕---✕ CONNECTED BY CLUTCH
■ FIXED BY BRAKE
● INPUT OR OUTPUT ROTATION

— SECOND GEAR STAGE —

○—○ CONSTANTLY CONNECTED
×---× CONNECTED BY CLUTCH
■ FIXED BY BRAKE
● INPUT OR OUTPUT ROTATION

— THIRD GEAR STAGE —

○——○ CONSTANTLY CONNECTED
×---× CONNECTED BY CLUTCH
■ FIXED BY BRAKE
● INPUT OR OUTPUT ROTATION

— FOURTH GEAR STAGE —

○——○ CONSTANTLY CONNECTED
✕----✕ CONNECTED BY CLUTCH
■ FIXED BY BRAKE
● INPUT OR OUTPUT ROTATION

— FIFTH GEAR STAGE —

○—○ CONSTANTLY CONNECTED
×----× CONNECTED BY CLUTCH
■ FIXED BY BRAKE
● INPUT OR OUTPUT ROTATION

— SIXTH GEAR STAGE —

○—○ CONSTANTLY CONNECTED
×---× CONNECTED BY CLUTCH
■ FIXED BY BRAKE
● INPUT OR OUTPUT ROTATION

— SEVENTH GEAR STAGE —

○—○ CONSTANTLY CONNECTED
×---× CONNECTED BY CLUTCH
■ FIXED BY BRAKE
● INPUT OR OUTPUT ROTATION

— EIGHTH GEAR STAGE —

○—○ CONSTANTLY CONNECTED
×--× CONNECTED BY CLUTCH
■ FIXED BY BRAKE
● INPUT OR OUTPUT ROTATION

— REVERSE GEAR STAGE —

○——○ CONSTANTLY CONNECTED
×----× CONNECTED BY CLUTCH
■ FIXED BY BRAKE
● INPUT OR OUTPUT ROTATION

|  | SUN GEAR | RING GEAR | FIRST PINION | SECOND PINION |
|---|---|---|---|---|
| PG1 | 39 | 108 | 35 | 35 |
| PG2 | 45 | 108 | 32 | 32 |
| PG3 | 39 | 108 | 35 |  |
| PG4 | 39 | 108 | 32 |  |

Fig. 17

| | REDUCTION RATIO | GEAR STEP |
|---|---|---|
| FIRST GEAR STAGE | 7.141 | |
| SECOND GEAR STAGE | 5.246 | 1.361 |
| THIRD GEAR STAGE | 3.769 | 1.392 |
| FOURTH GEAR STAGE | 2.714 | 1.389 |
| FIFTH GEAR STAGE | 2.000 | 1.357 |
| SIXTH GEAR STAGE | 1.464 | 1.366 |
| SEVENTH GEAR STAG | 1.230 | 1.191 |
| EIGHTH GEAR STAGE | 1.000 | 1.230 |
| REVERSE GEAR STAGE | -3.747 | |

Fig. 18

AUTOMATIC TRANSMISSION

TECHNICAL FIELD

The present invention relates to an automatic transmission mounted on a vehicle and belongs to a technical field of transmissions for vehicles.

BACKGROUND ART

An automatic transmission mounted on a vehicle typically includes: a plurality of planetary gear sets (planetary gear mechanisms); and a plurality of hydraulic friction engaging elements such as clutches and brakes. By selectively engaging the friction engaging elements via hydraulic control, power transmission paths passing through the planetary gear sets are switched, and as a result, a plurality of forward gear stages and typically one reverse gear stage can be realized.

For example, PTL 1 discloses an automatic transmission which includes three single pinion type planetary gear sets and five friction engaging elements and realizes six forward gear stages and one reverse gear stage by engaging any two of the friction engaging elements.

On the other hand, in recent years, to improve fuel efficiency of an engine and gear shifting performance, a further increase in the number of forward gear stages has been desired. For example, an automatic transmission is considered, which includes three planetary gear sets and six friction engaging elements and realizes eight forward gear stages by combinations each realized by engaging any two of the friction engaging elements.

According to this configuration, four friction engaging elements which are not engaged exist at each gear stage. Therefore, there is a possibility that due to sliding resistance between friction plates of the friction engaging elements, viscous resistance of lubricating oil between the friction plates, and the like, a driving loss of the entire transmission will become large, and an improvement effect of the fuel efficiency by the increase in the number of gear stages will deteriorate.

PTL 2 discloses an automatic transmission which includes two single pinion type planetary gear sets, two double pinion type planetary gear sets, and five friction engaging elements and realizes eight forward gear stages by selectively engaging any three of the friction engaging elements.

According to this configuration, the number of friction engaging elements which are not engaged at each gear stage is two. Therefore, a driving loss such as that above is reduced. In addition, since the double pinion type planetary gear set with a higher degree of freedom in setting a change gear ratio compared to the single pinion type planetary gear set is included, a merit of being able to appropriately set the distribution of gear steps (a reduction ratio of a lower gear stage/a reduction ratio of an upper gear stage) between the adjacent gear stages can be expected.

CITATION LIST

Patent Literature

PTL 1: Japanese Laid-Open Patent Application Publication No. 2008-298126

PTL 2: Japanese Laid-Open Patent Application Publication No. 2009-174626

SUMMARY OF INVENTION

Technical Problem

According to the configuration of the automatic transmission disclosed in PTL 2, a directly coupled gear stage whose reduction ratio is 1 is a fifth gear stage, there are four speed reduction gear stages and three speed increasing gear stages, and the reduction ratios are low. Therefore, if an engine whose displacement is small relative to a vehicle weight is mounted on a vehicle, a driving force of the vehicle may not be adequate. Especially, a starting/accelerating performance of the vehicle may not be adequate. Therefore, according to this automatic transmission, the reduction ratio of a first gear stage is set to be high. On account of this, the gear step between the first and second gear stages is higher than each of the other gear steps. Thus, an appropriate distribution property of the gear steps is sacrificed (see Comparative Example shown in FIG. 19).

One solution to this problem is to increase a final reduction ratio so that a desired driving force and starting/accelerating performance are secured while realizing the appropriate distribution of the gear steps. However, in such a case, an input gear of a differential mechanism constituting a final reducer increases in size, especially when the transmission is configured as a transversely mounted type. For example, in the case of a front engine front drive vehicle in which a drive unit integrated with the differential mechanism is constituted, the drive unit becomes large, and mountability of the automatic transmission to an engine room becomes a problem.

In the automatic transmission disclosed in PTL 2, the directly coupled gear stage may be set to a high gear stage that is not lower than a sixth gear stage. Among ten combinations in each of which three of the five friction engaging elements are engaged, in one combination which is not used at the first to eighth gear stages and the reverse gear stage, that is, in the combination in which a clutch C1 and brakes B1 and B2 are engaged, clutches Ca and Cb are released. Therefore, a carrier Cr of a planetary gear set 8 becomes free. On this account, rotational force cannot be output to a ring gear Rr of the planetary gear set 8 to which an output gear 3 is coupled. Thus, the automatic transmission becomes a neutral state.

To be specific, the automatic transmission disclosed in PTL 2 cannot be configured such that a new gear stage(s) is provided at a lower side of the fifth gear stage and the directly coupled gear stage is set to a gear stage that is not lower than the sixth gear stage.

Further, in this automatic transmission, to set the directly coupled gear stage to a gear stage that is not lower than the sixth gear stage, a part of coupling relations between rotational elements of the planetary gear sets and relations among the rotational elements and the friction engaging elements may be changed. However, typically, changing a part of the configuration of the automatic transmission affects the other parts. Therefore, to realize appropriate reduction ratios for each of the gear stages and appropriate gear steps between the gear stages with realizable gear sizes, a new automatic transmission needs to be configured from scratch.

In light of the above circumstances regarding the increase in the number of gear stages of the automatic transmission, an object of the present invention is to realize an automatic transmission which realizes eight forward gear stages and is configured such that the directly coupled gear stage can be set to the eighth gear stage, and the appropriate distribution of the gear steps between the gear stages can be realized. As a result of diligent studies, the above object of the present invention was achieved.

Solution to Problem

To achieve the above object, an automatic transmission according to the present invention is configured as follows.

A first aspect of the present invention is an automatic transmission including in a transmission case: an input shaft connected to a driving source; an output member provided coaxially with the input shaft and connected to a differential mechanism; a double pinion type first planetary gear set including a first sun gear, a first ring gear, and a first carrier; a double pinion type second planetary gear set including a second sun gear, a second ring gear, and a second carrier: a single pinion type third planetary gear set including a third sun gear, a third ring gear, and a third carrier; a single pinion type fourth planetary gear set including a fourth sun gear, a fourth ring gear, and a fourth carrier; first, second, and third clutches; and first and second brakes, wherein: the input shaft and the first sun gear are constantly connected to each other; the output member and the fourth carrier are constantly connected to each other; the first ring gear and the fourth ring gear are constantly connected to each other; the first carrier and the second sun gear are constantly connected to each other; the second ring gear and the third ring gear are constantly connected to each other; the third carrier and the fourth sun gear are constantly connected to each other; the first clutch connects and disconnects the first carrier to and from a group consisting of the fourth carrier and the output member; the second clutch connects and disconnects the second carrier to and from a group consisting of the first ring gear and the fourth ring gear; the third clutch connects and disconnects the second carrier to and from a group consisting of the third carrier and the fourth sun gear; the first brake connects and disconnects a group consisting of the second ring gear and the third ring gear to and from the transmission case; the second brake connects and disconnects the third sun gear to and from the transmission case; and when the first, second, and third clutches are engaged, and the first and second brakes are released, an eighth gear stage whose reduction ratio is 1 is formed.

A second aspect of the present invention is configured such that in first aspect of the present invention, among the first, second, and third clutches and the first and second brakes: when the second clutch, the first brake, and the second brake are engaged, a first gear stage is formed; when the second clutch, the third clutch, and the first brake are engaged, a second gear stage is formed; when the third clutch, the first brake, and the second brake are engaged, a third gear stage is formed; when the first clutch, the third clutch, and the first brake are engaged, a fourth gear stage is formed; when the first clutch, the first brake, and the second brake are engaged, a fifth gear stage is formed; when the first clutch, the third clutch, and the second brake are engaged, a sixth gear stage is formed; the first clutch, the second clutch, and the second brake are engaged, a seventh gear stage is formed; and when the first clutch, the second clutch, and the first brake are engaged, a reverse gear stage is formed.

Advantageous Effects of Invention

According to the first aspect of the present invention, by the above configuration, in the automatic transmission which realizes eight forward gear stages and includes two double pinion type planetary gear sets, two single pinion type planetary gear sets, and five friction engaging elements, the directly coupled gear stage can be set to the eighth gear stage, and the number of speed reduction gear stages is greater than that of the above automatic transmission in which the directly coupled gear stage is the fifth gear stage.

Therefore, the reduction ratios can be set to be high as a whole. When the automatic transmission according to the first aspect of the present invention is applied to a small displacement engine, an increase in a final reduction ratio, an increase in the size of a drive unit due to the increase in the final reduction ratio, a deterioration of mountability of the automatic transmission to an engine room, and the like are avoided. In addition, while realizing appropriate setting of the gear steps between the gear stages, desired driving force and starting/accelerating performance can be realized.

Further, according to the second aspect of the present invention, by appropriately setting the numbers of teeth of the sun gear and ring gear of each planetary gear set, the reduction ratios of the first to seventh gear stages and the reverse gear stage are appropriately set.

BRIEF DESCRIPTION OF DRAWINGS

FIG. 2 is a table showing engagements of friction engaging elements of the automatic transmission.

FIG. 17 is a table showing an example of the numbers of teeth of gears constituting planetary gear sets.

FIG. 18 is a table showing reduction ratios and gear steps in the case of the example shown in FIG. 17.

DESCRIPTION OF EMBODIMENTS

Hereinafter, embodiments of the present invention will be explained.

Figure 1:
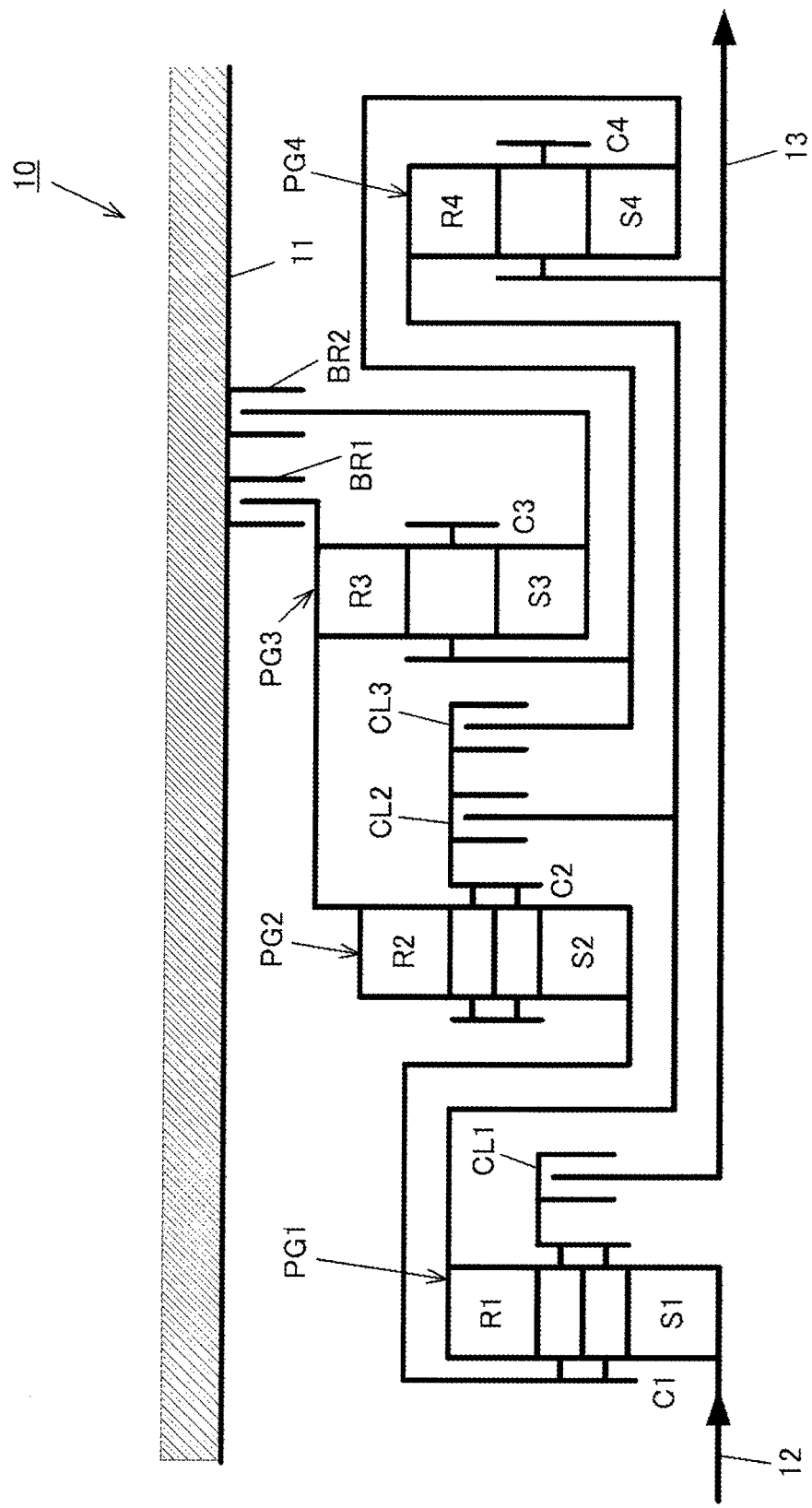
FIG. 1 is a schematic diagram showing an automatic transmission according to Embodiment 1 of the present invention.

FIG. 1 is a schematic diagram showing the configuration of an automatic transmission 10 according to Embodiment 1 of the present invention. The automatic transmission 10 includes an input shaft 12 and an output shaft 13 in a transmission case 11. The input shaft 12 and the output shaft 13 are provided on the same axis. Double pinion type first and second planetary gear sets (hereinafter simply referred to as "first and second gear sets") PG1 and PG2 and single pinion type third and fourth planetary gear sets (hereinafter simply referred to as "third and fourth gear sets") PG3 and PG4 are provided on center axes of the input and output shafts 12 and 13 in this order from a left side (driving source side) in FIG. 1.

A first clutch CL1 is provided between the first gear set PG1 and the second gear set PG2. A second clutch CL2 and a third clutch CL3 are provided between the second gear set PG2 and the third gear set PG3 in this order from an input side. First and second brakes BR1 and BR2 are provided near the third gear set PG3 in this order from the input side.

Each of the first to fourth gear sets PG1 to PG4 includes three rotational elements. The first gear set PG1 includes a first sun gear S1, a first ring gear R1, and a first carrier C1 as the rotational elements. The second gear set PG2 includes a second sun gear S2, a second ring gear R2, and a second carrier C2 as the rotational elements. The third gear set PG3 includes a third sun gear S3, a third ring gear R3, and a third carrier C3 as the rotational elements. The fourth gear set PG4 includes a fourth sun gear S4, a fourth ring gear R4, and a fourth carrier C4 as the rotational elements.

The double pinion type first gear set PG1 includes: a first pinion that meshes with the first sun gear S1; and a second pinion that meshes with the first pinion and the first ring gear R1, and these pinions are supported by the first carrier C1. The double pinion type second gear set PG2 includes: a first pinion that meshes with the second sun gear S2; and a second pinion that meshes with the first pinion and the second ring gear R2, and these pinions are supported by the second carrier C2. The single pinion type third gear set PG3 includes a pinion that meshes with the third sun gear S3 and the third ring gear R3, and this pinion is supported by the third carrier C3. The single pinion type fourth gear set PG4 includes a pinion that meshes with the fourth sun gear S4 and the fourth ring gear R4, and this pinion is supported by the third carrier C4.

Further, in the automatic transmission 10, the first ring gear R1 and the fourth ring gear R4 are constantly connected to each other, and the first carrier C1 and the second sun gear S2 are constantly connected to each other. Further, the second ring gear R2 and the third ring gear R3 are constantly connected to each other, and the third carrier C3 and the fourth sun gear S4 are constantly connected to each other. The input shaft 12 is constantly connected to the first sun gear S1, and the output shaft 13 is constantly connected to the fourth carrier C4.

The first clutch CL1 is provided between the first carrier C1 and a group consisting of the fourth carrier C4 and the output shaft 13, and connects and disconnects the first carrier C1 to and from the group consisting of the fourth carrier C4 and the output shaft 13. The second clutch CL2 is provided between the second carrier C2 and a group consisting of the first ring gear R1 and the fourth ring gear R4, and connects and disconnects the second carrier C2 to and from the group of consisting the first ring gear R1 and the fourth ring gear R4. The third clutch CL3 is provided between the second carrier C2 and a group consisting of the third carrier C3 and the fourth sun gear S4, and connects and disconnects the second carrier C2 to and from the group consisting of the third carrier C3 and the fourth sun gear S4.

Further, the first brake BR1 is provided between the transmission case 11 and a group consisting of the second ring gear R2 and the third ring gear R3, and connects and disconnects the transmission case 11 to and from the group consisting of the second ring gear R2 and the third ring gear R3. The second brake BR2 is provided between the transmission case 11 and the third sun gear S3, and connects and disconnects the transmission case 11 to and from the third sun gear S3.

By the above configuration, the automatic transmission 10 forms first to eighth forward gear stages and a reverse gear stage by selectively engaging three of the five friction engaging elements as shown in the table of FIG. 2.

Next, a mechanism of determining reduction ratios of the gear stages in accordance with combinations of the engagements of the friction engaging elements shown in FIG. 2 will be explained in reference to FIGS. 3A to 11B.

In each of FIGS. 3A, 4A, 5A, 6A, 7A, 8A, 9A, 10A, and 11A, the friction engaging elements that are engaged at each gear stage are shown by hatching. In each of FIGS. 3B, 4B, 5B, 6B, 7B, 8B, 9B, 10B, and 11B, the reduction ratio at each gear stage is shown by a line diagram. In this line diagram showing the reduction ratio, a lateral interval between the rotational elements in each of the gear sets PG1 to PG4 is determined based on a gear ratio. In each of the double pinion type gear sets PG1 and PG2, the carrier, the ring gear, and the sun gear are provided in this order. In each of the single pinion type gear sets PG3 and PG4, the ring gear, the carrier, and the sun gear are provided in this order.

In addition, a vertical axis denotes a rotating speed. An input rotating speed that is a rotating speed of each of the input shaft 12 and the first sun gear S1 constantly connected to the input shaft 12 is "1," and a rotating speed of the rotational element fixed by the brake is "0." The rotating speeds of the rotational elements constantly connected to each other are equal to each other, and the rotating speeds of the rotational elements connected to each other by the clutch are equal to each other. Each of N1 to N8 and Nr denotes a rotating speed of the rotation output from the first carrier C1, the fourth carrier C4, or the output shaft 13 at each gear stage, and a reciprocal number of this output rotating speed is the reduction ratio at the gear stage.

Figure 3A:
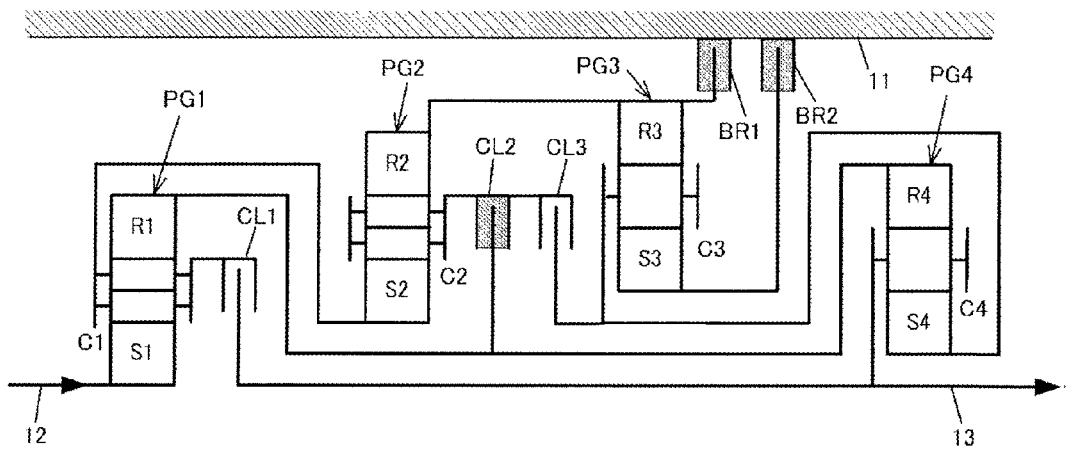
FIGS. 3A and 3B are a schematic diagram and a reduction ratio line diagram, respectively, each showing engaged states of the friction engaging elements at a first gear stage.
Figure 3B:
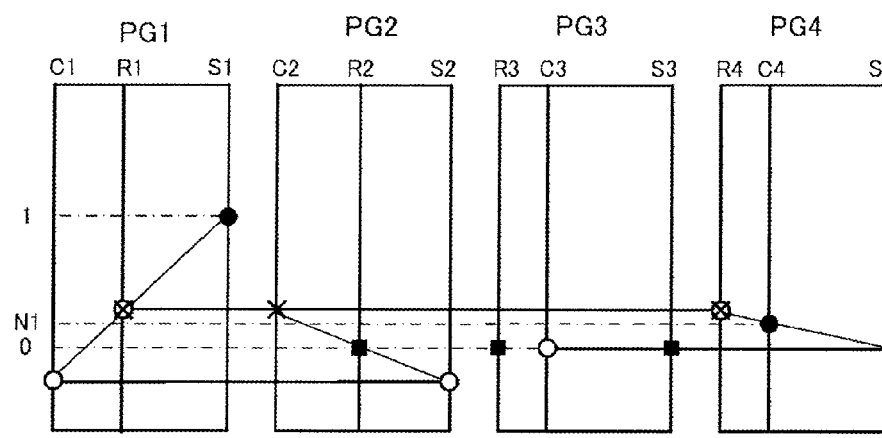

First, as shown in FIGS. 3A and 3B, at the first gear stage, the second clutch CL2 and the first and second brakes BR1 and BR2 are engaged. Therefore, the second carrier C2 and the first and fourth ring gears R4 constantly connected to each other are connected to one another to rotate together. In addition, the rotating speeds of the second and third ring gears R2 and R3 and the third sun gear S3 are "0." Further, in the third gear set PG3, the rotating speeds of the third sun gear S3 and the third ring gear R3 are "0." With this, the entire third gear set PG3 is fixed, and the rotating speeds of the third carrier C3 and the fourth sun gear S4 constantly connected to the third carrier C3 are also "0."

Since there are the above conditions, and the first carrier C1 and the second sun gear S2 are constantly connected to each other, the rotating speed of the fourth carrier C4 relative to the rotating speed "1" of the first sun gear S1 is determined, and this rotating speed is an output rotating speed N1.

Figure 4A:
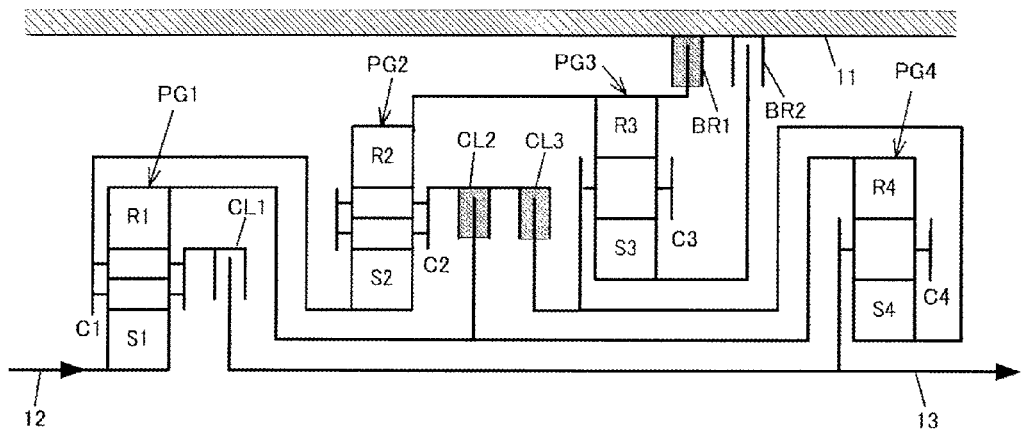
FIGS. 4A and 4B are a schematic diagram and a reduction ratio line diagram, respectively, each showing the engaged states of the friction engaging elements at a second gear stage.
Figure 4B:
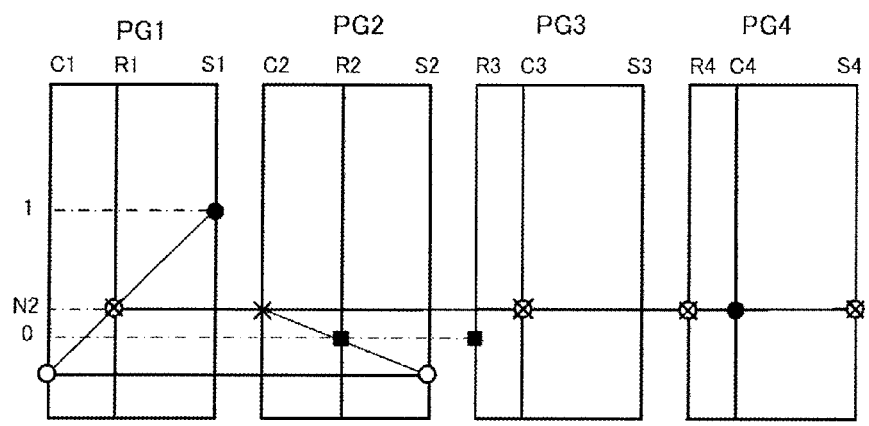

Next, as shown in FIGS. 4A and 4B, at the second gear stage, the second and third clutches CL2 and CL3 and the first brake BR1 are engaged. Therefore, the second carrier C2 and the first and fourth ring gears R1 and R4 constantly connected to each other are connected to one another to rotate together. In addition, the second carrier C2 and the third carrier C3 are connected to each other, so that the second carrier C2, the third carrier C3, and the fourth sun gear S4 constantly connected to the third carrier C3 rotate together. As a result, both the fourth sun gear S4 and the fourth ring gear R4 rotate together with the second carrier C2. Thus, the fourth gear set PG4 is integrated, and the fourth carrier C4 also rotates together.

Since the rotating speeds of the second and third ring gears R2 and R3 are "0," and the first carrier C1 and the second sun gear S2 are constantly connected to each other, the rotating speed of each of the above rotational elements which rotate together, relative to the rotating speed "1" of the first sun gear S1, is determined, and this rotating speed is output from the fourth carrier C4 as an output rotating speed N2.

Figure 5A:
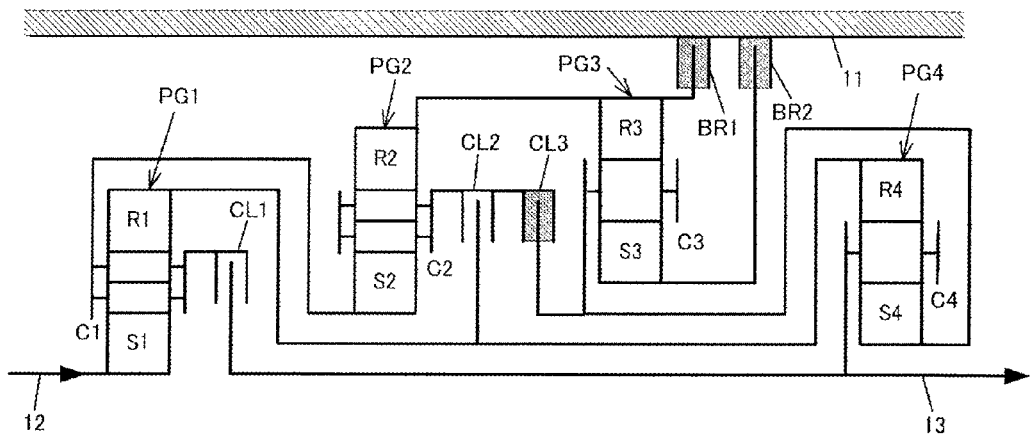
FIGS. 5A and 5B are a schematic diagram and a reduction ratio line diagram, respectively, each showing the engaged states of the friction engaging elements at a third gear stage.
Figure 5B:
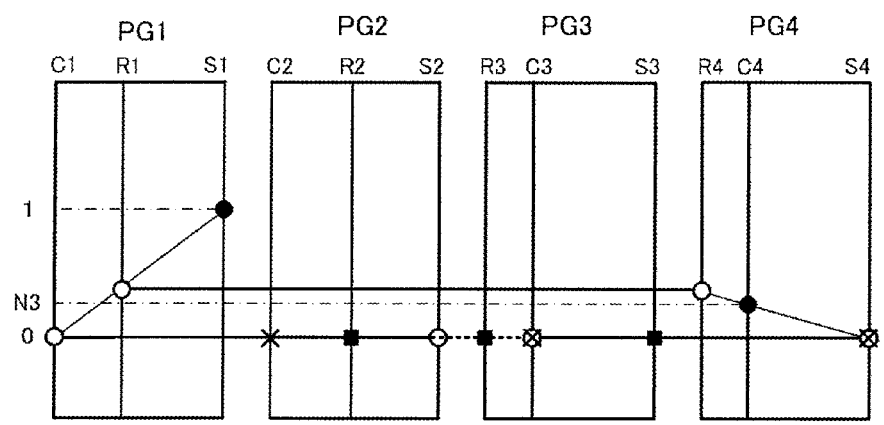

Next, as shown in FIGS. 5A and 5B, at the third gear stage, the third clutch CL3 and the first and second brakes BR1 and BR2 are engaged. Therefore, the rotating speeds of the second and third ring gears R2 and R3 and the third sun gear S3 are "0," and the entire third gear set PG3 is fixed. Thus, the rotating speed of the third carrier C3 and the rotating speed of the second carrier C2 connect to the third carrier C3 are also "0." Therefore, the entire second gear set PG2 is also fixed, and the rotating speed of the second sun gear S2 is also "0."

Further, since the entire second and third gear sets PG2 and PG3 are fixed, the rotating speed of the first carrier C1 constantly connected to the second sun gear S2 and the rotating speed of the fourth sun gear S4 constantly connected to the third carrier C3 are also "0."

Since there are the above conditions, and the first ring gear R1 and the fourth ring gear R4 are constantly connected to each other, the rotating speed of the fourth carrier C4 relative to the input rotating speed "1" of the first sun gear S1 is determined, and this rotating speed is an output rotating speed N3.

Figure 6A:
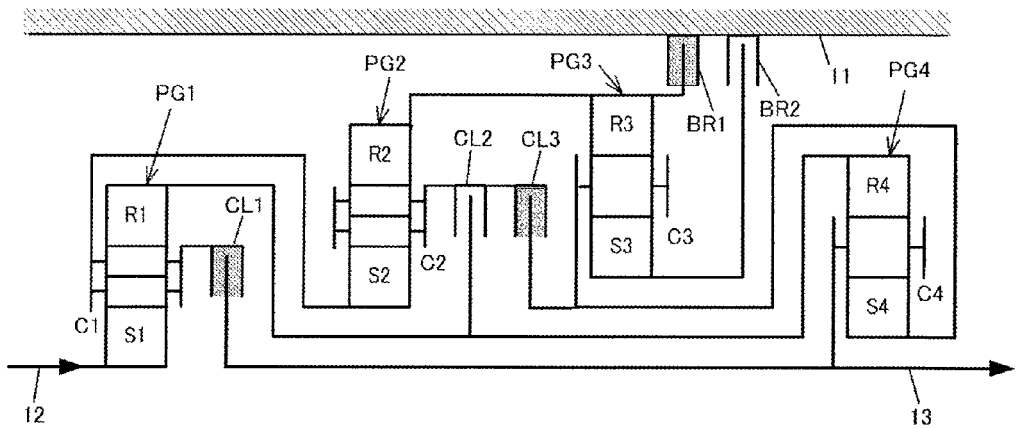
FIGS. 6A and 6B are a schematic diagram and a reduction ratio line diagram, respectively, each showing the engaged states of the friction engaging elements at a fourth gear stage.
Figure 6B:
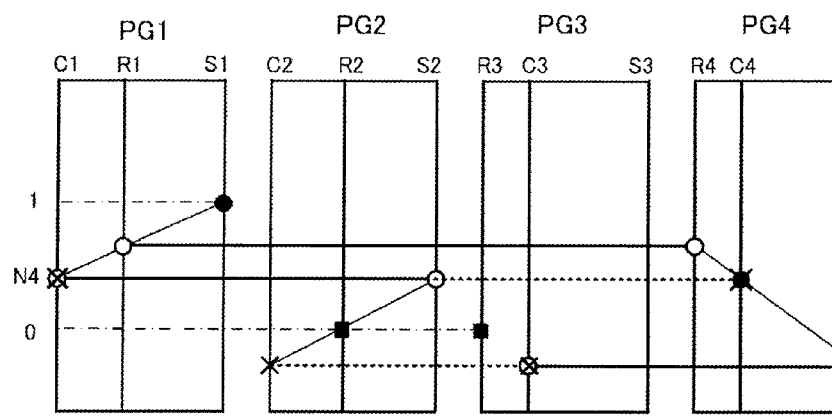

Next, as shown in FIGS. 6A and 6B, at the fourth gear stage, the first and third clutches CL1 and CL3 and the first brake BR1 are engaged. Therefore, the first carrier C1 and the fourth carrier C4 are connected to each other, so that the first carrier C1, the fourth carrier C4, and the second sun gear S2 constantly connected to the first carrier C1 rotate together. Further, the second carrier C2 and the third carrier C3 are connected to each other, so that the second carrier C2, the third carrier C3, and the fourth sun gear S4 constantly connected to the third carrier C3 rotate together. The rotating speeds of the second ring gear R2 and the third ring gear R3 are "0."

Since there are the above conditions, and the first ring gear R1 and the fourth ring gear R4 are constantly connected to each other, the rotating speed of the fourth carrier C4 relative to the input rotating speed "1" of the first sun gear S1 is determined, and this rotating speed is an output rotating speed N4.

Figure 7A:
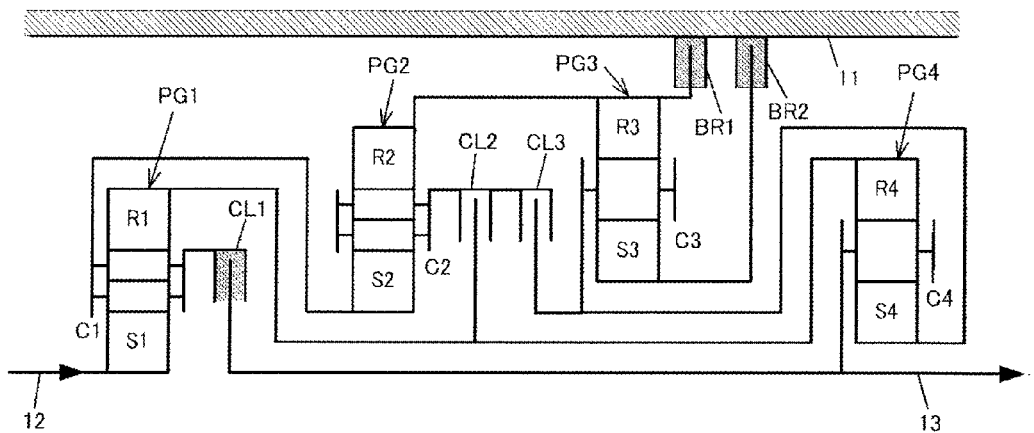
FIGS. 7A and 7B are a schematic diagram and a reduction ratio line diagram, respectively, each showing the engaged states of the friction engaging elements at a fifth gear stage.
Figure 7B:
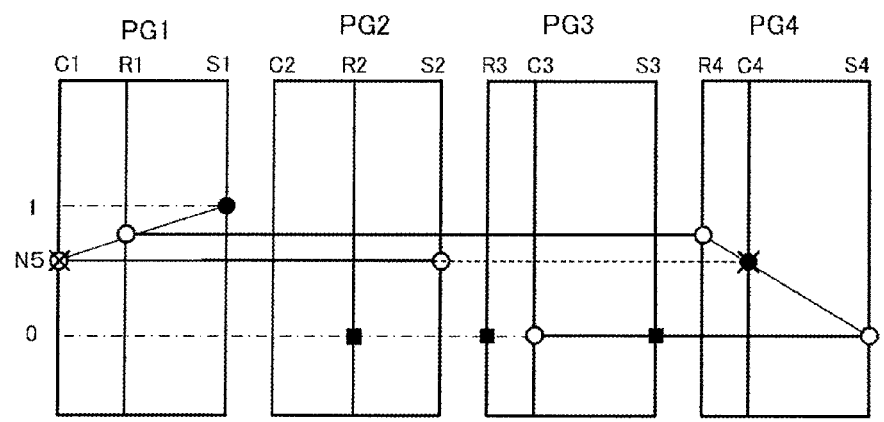

Next, as shown in FIGS. 7A and 7B, at the fifth gear stage, the first clutch CL1 and the first and second brakes BR1 and BR2 are engaged. Therefore, the rotating speeds of the second and third ring gears R2 and R3 and the third sun gear S3 are "0," and the entire third gear set PG3 is fixed. Thus, the rotating speeds of the third carrier C3 and the fourth sun gear S4 constantly connected to the third carrier C3 are also "0." Further, the first carrier C1 and the fourth carrier C4 are connected to each other to rotate together.

Since there are the above conditions, and the first ring gear R1 and the fourth ring gear R4 are constantly connected to each other to rotate together, the rotating speed of the fourth carrier C4 relative to the input rotating speed "1" of the first sun gear S1 is determined, and this rotating speed is an output rotating speed N5.

Figure 8A:
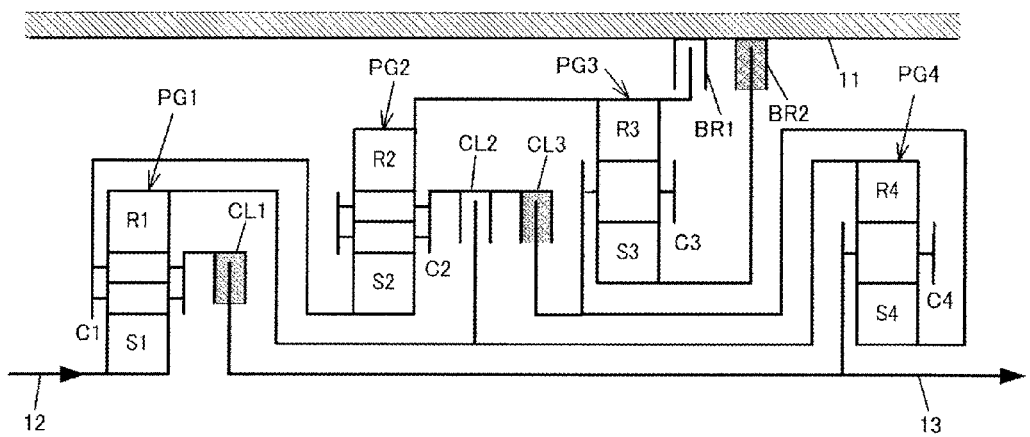
FIGS. 8A and 8B are a schematic diagram and a reduction ratio line diagram, respectively, each showing the engaged states of the friction engaging elements at a sixth gear stage.
Figure 8B:
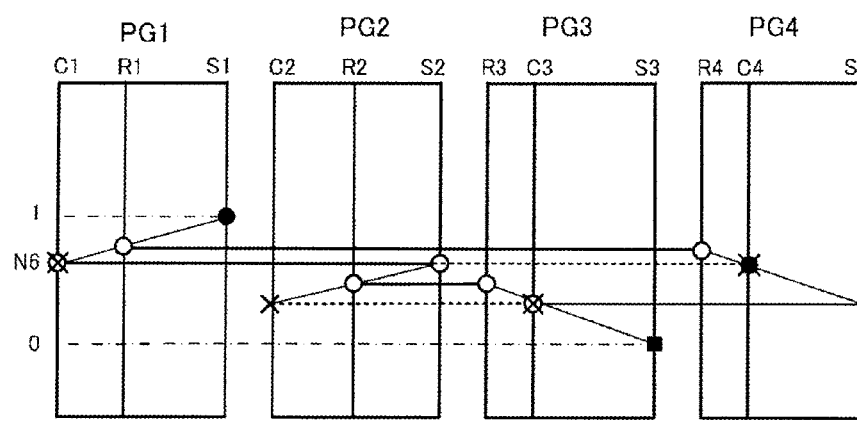

Next, as shown in FIGS. 8A and 8B, at the sixth gear stage, the first and third clutches CL1 and CL3 and the second brake BR2 are engaged. Therefore, the first carrier C1 and the fourth carrier C4 are connected to each other, so that the first carrier C1, the fourth carrier C4, and the second sun gear S2 constantly connected to the first carrier C1 rotate together. Further, the second carrier C2 and the third carrier C3 are connected to each other, so that the second carrier C2, the third carrier C3, and the fourth sun gear S4 constantly connected to the third carrier C3 rotate together. The rotating speed of the third sun gear S3 is "0."

Since there are the above conditions, and the first and fourth ring gears R1 and R4 are constantly connected to each other and the second and third ring gears R2 and R3 are constantly connected to each other, the rotating speed of the fourth carrier C4 relative to the input rotating speed "1" of the first sun gear S1 is determined, and this rotating speed is an output rotating speed N6.

Figure 9A:
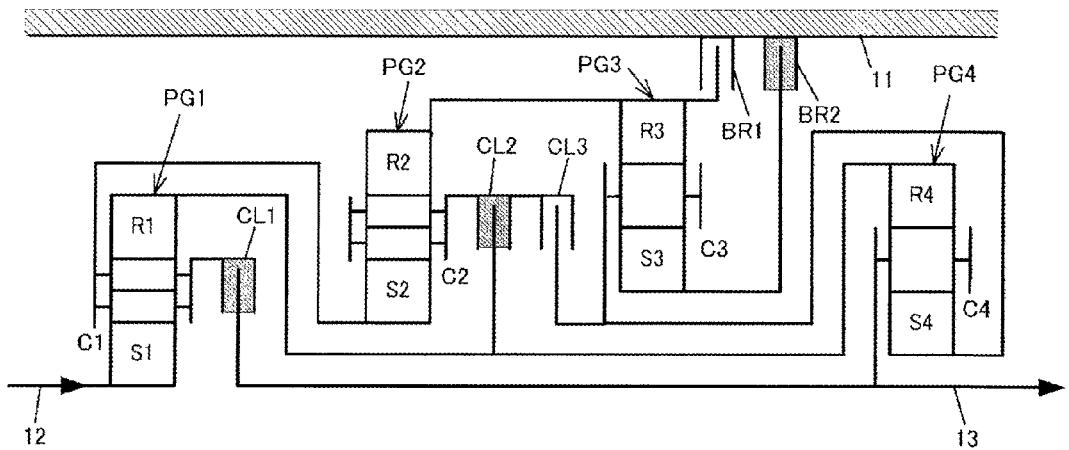
FIGS. 9A and 9B are a schematic diagram and a reduction ratio line diagram, respectively, each showing the engaged states of the friction engaging elements at a seventh gear stage.
Figure 9B:
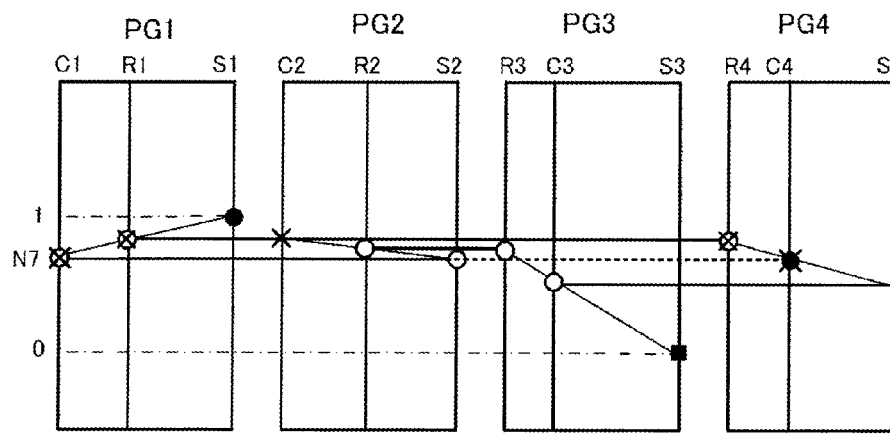

Next, as shown in FIGS. 9A and 9B, at the seventh gear stage, the first and second clutches CL1 and CL2 and the second brake BR2 are engaged. Therefore, the first carrier C1 and the fourth carrier C4 are connected to each other, so that the first carrier C1, the fourth carrier C4, and the second sun gear S2 constantly connected to the first carrier C1 rotate together. Further, the second carrier C2 and the first and fourth ring gears R1 and R4 constantly connected to each other are connected to one another to rotate together. The rotating speed of the third sun gear S3 is "0."

Since there are the above conditions, and the second and third ring gears R2 and R3 are constantly connected to each other and the third carrier C3 and the fourth sun gear S4 are constantly connected to each other, the rotating speed of the fourth carrier C4 relative to the input rotating speed "1" of the first sun gear S1 is determined, and this rotating speed is an output rotating speed N7.

Figure 10A:
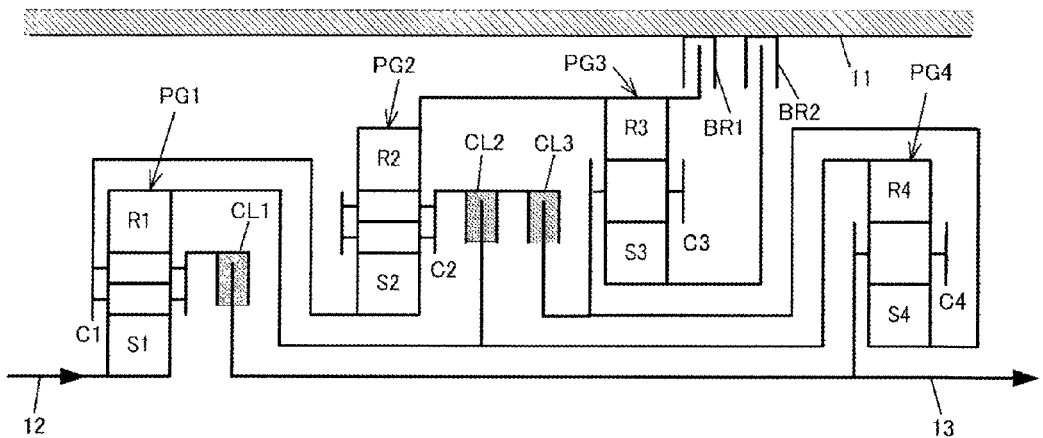
FIGS. 10A and 10B are a schematic diagram and a reduction ratio line diagram, respectively, each showing the engaged states of the friction engaging elements at an eighth gear stage.
Figure 10B:
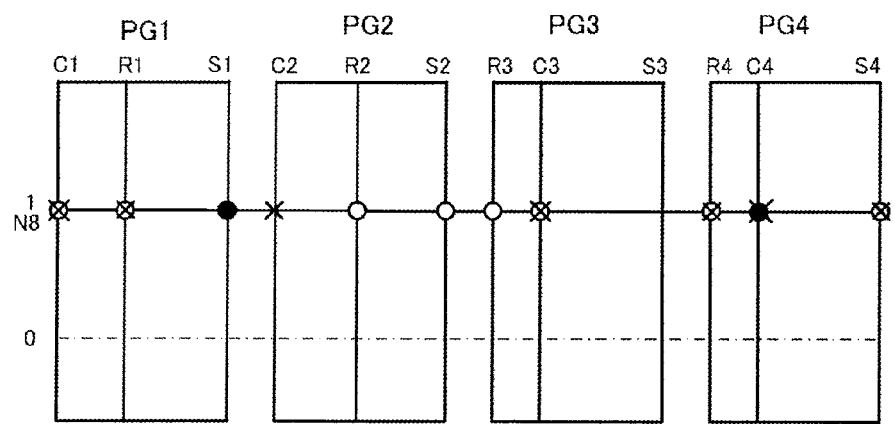

Next, as shown in FIGS. 10A and 10B, at the eighth gear stage, the first, second, and third clutches CL1, CL2, and CL3 are engaged. Therefore, the first carrier C1 and the fourth carrier C4 are connected to each other, so that the first carrier C1, the fourth carrier C4, and the second sun gear S2 constantly connected to the first carrier C1 rotate together. Further, the second carrier C2 and the first and fourth ring gears R1 and R4 constantly connected to each other are connected to one another to rotate together. Furthermore, the second carrier C2 and the third carrier C3 are connected to each other, so that the second carrier C2, the third carrier C3, and the fourth sun gear S4 constantly connected to the third carrier C3 rotate together.

Therefore, the fourth sun gear S4 and the fourth ring gear R4 in the fourth gear set PG4 rotate together with the second carrier C2. Thus, the fourth gear set is integrated. The fourth carrier C4 also rotates together, and the first carrier C1 connected to the fourth carrier C4 also rotate together.

Therefore, the first carrier C1 and the first ring gear R1 in the first gear set PG1 also rotate together with the above rotational elements. Thus, the first gear set PG1 is also integrated. As a result, the rotating speed of the first carrier C1 relative to the input rotating speed "1" of the first sun gear S1 and the rotating speed of the fourth carrier C4 connected to the first carrier C1, relative to the input rotating speed "1" of the first sun gear S1 are also "1," and this rotating speed is an output rotating speed N8. To be specific, the eighth gear stage is the directly coupled gear stage whose reduction ratio is "1."

At this time, the second and third gear sets PG2 and PG3 also rotate integrally at the same rotating speed as the first and fourth gear sets PG1 and PG4. Thus, all the first to fourth gear sets PG1 to PG4 integrally rotate at the input rotating speed "1."

Figure 11A:
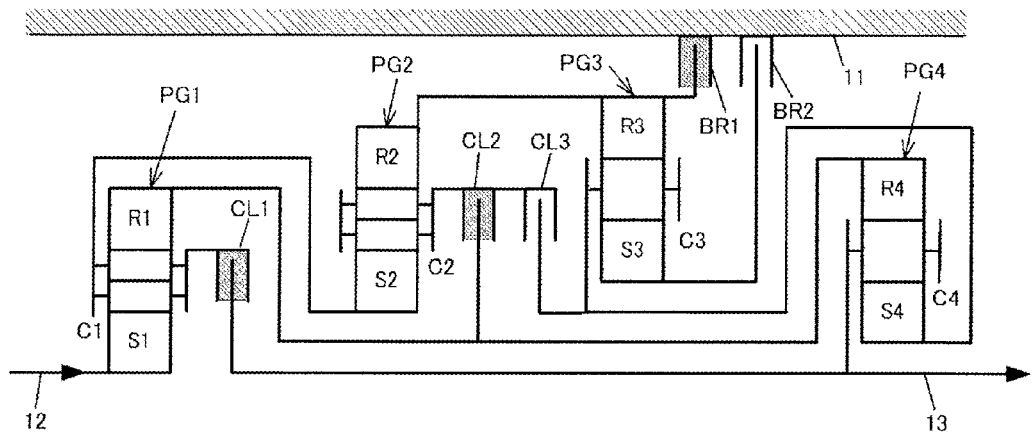
FIGS. 11A and 11B are a schematic diagram and a reduction ratio line diagram, respectively, each showing the engaged states of the friction engaging elements at a reverse gear stage.
Figure 11B:
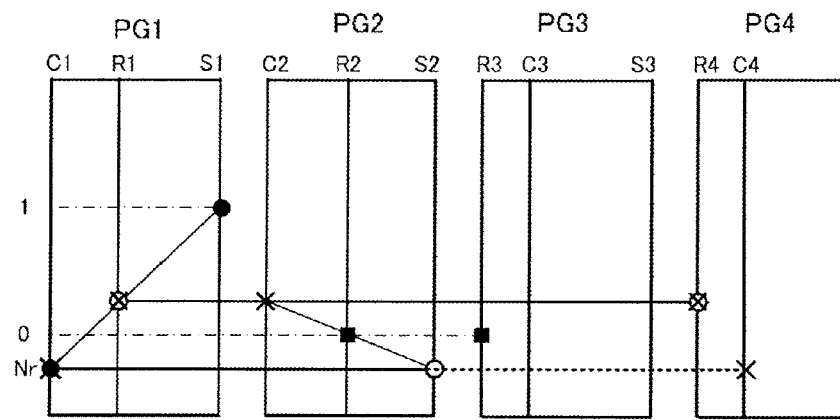

Further, as shown in FIGS. 11A and 11B, at the reverse gear stage, the first and second clutches CL1 and CL2 and the first brake BR1 are engaged. Therefore, the first carrier C1 and the fourth carrier C4 are connected to each other, so that the first carrier C1, the fourth carrier C4, and the second sun gear S2 constantly connected to the first carrier C1 rotate together. Further, the second carrier C2 and the first and fourth ring gears R1 and R4 constantly connected to each other are connected to one another to rotate together.

Based on the conditions in which the rotating speed of the first sun gear S1 in the first gear set PG1 is "1," and the rotating speed of the second ring gear R2 in the second gear set PG2 is "0," the rotating speed of the first carrier C1 and the second sun gear S2 which rotate together is determined, and this rotating speed is an output rotating speed Nr that is a negative value.

As above, by the combinations of the engagements of the five friction engaging elements shown in FIGS. 2A and 2B, the rotating speeds N1 to N8 and Nr can be set so as to satisfy "N1<N2<N3<N4<N5<N6<N7<N8" and "Nr<0," and by the above configuration, N8 is equal to 1. Therefore, the automatic transmission which realizes eight forward gear stages and one reverse gear stage and in which the eighth gear stage is the directly coupled gear stage whose reduction ratio is "1" is obtained.

Therefore, the number of speed reduction gear stages of the automatic transmission of the present embodiment is greater than that of the automatic transmission in which the directly coupled gear stage is, for example, the fifth gear stage. Thus, the reduction ratios of low gear stages can be set to be high. On this account, when the automatic transmission of the present embodiment is applied to a small displacement engine, an increase in a final reduction ratio, an increase in the size of a differential device or a drive unit due to the increase in the final reduction ratio, a deterioration of mountability of the automatic transmission to an engine room, and the like are suppressed. In addition, while realizing appropriate setting of the gear steps between the gear stages, the desired driving force and starting/accelerating performance can be realized.

Next, the automatic transmissions according to Embodiments 2 to 6 shown in FIGS. 12 to 16 will be explained.

As with the above embodiment, according to the automatic transmissions of these embodiments, the double pinion type first and second gear sets, the single pinion type third and fourth gear sets, the first, second, and third clutches, and the first and second brakes are provided on the axes of the input and output shafts provided on the same axis.

These components are the same as those in Embodiment 1. Therefore, regarding the first to fourth gear sets, the rotational elements of the first to fourth gear sets, and the friction engaging elements, the same reference signs as Embodiment 1 are used in the following explanations.

Among the embodiments, the order of arrangement of the first to fourth gear sets on the above axis is different, and therefore, the arrangement of the friction engaging elements is also different.

Figure 12:
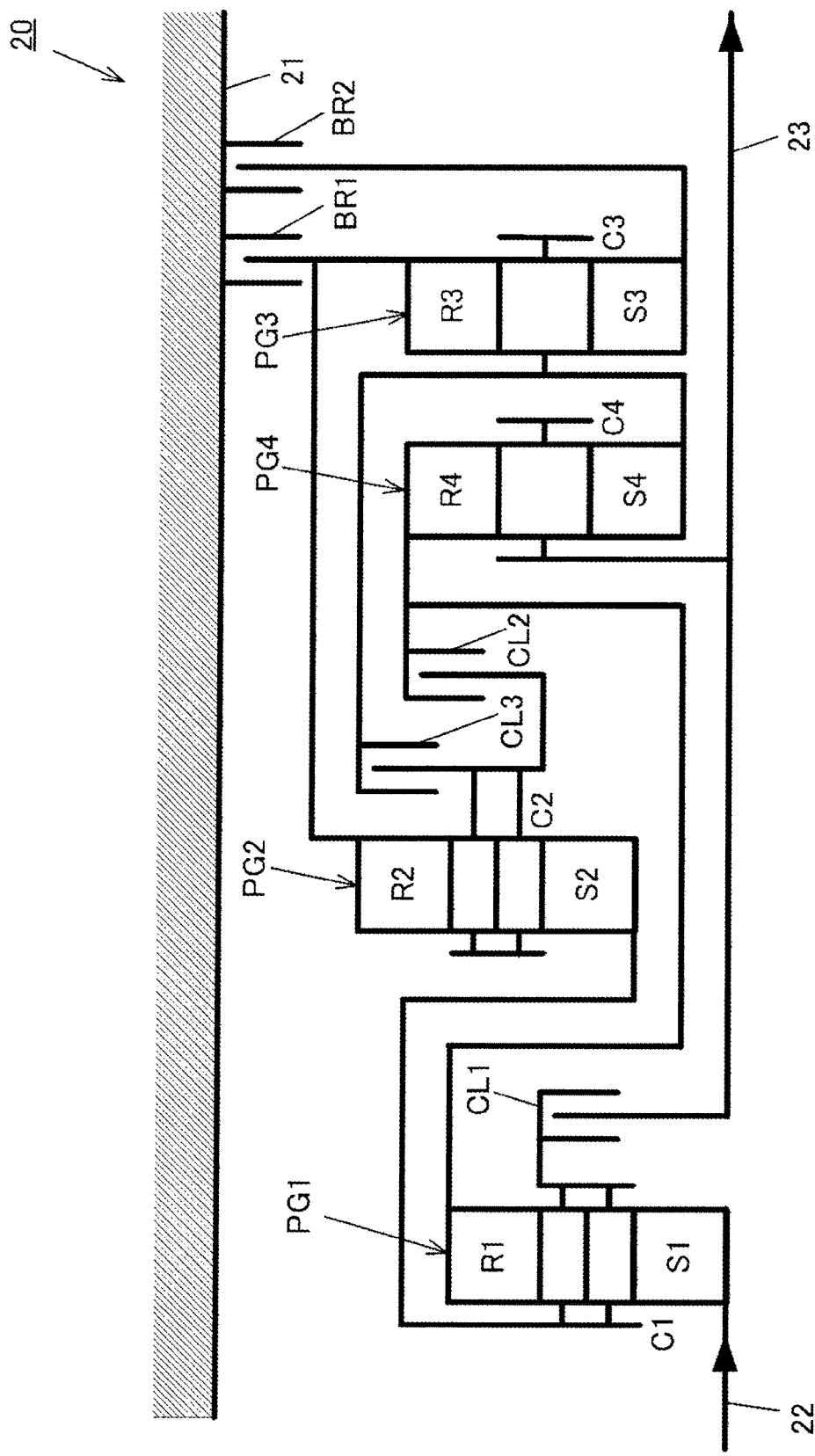
FIG. 12 is a schematic diagram showing the automatic transmission according to Embodiment 2.

To be specific, in the automatic transmission 20 according to Embodiment 2 shown in FIG. 12, the first gear set PG1, the second gear set PG2, the fourth gear set PG4, and the third gear set PG3 are provided on the axes of input and output shafts 22 and 23 in this order from the input side.

Further, the first clutch CL1 is provided between the first gear set PG1 and the second gear set PG2. The third clutch CL3 and the second clutch CL2 are provided between the second gear set PG2 and the fourth gear set PG4 in this order from the input side. The first brake BR1 and the second brake BR2 are provided near the third gear set PG3 in this order from the input side.

Figure 13:
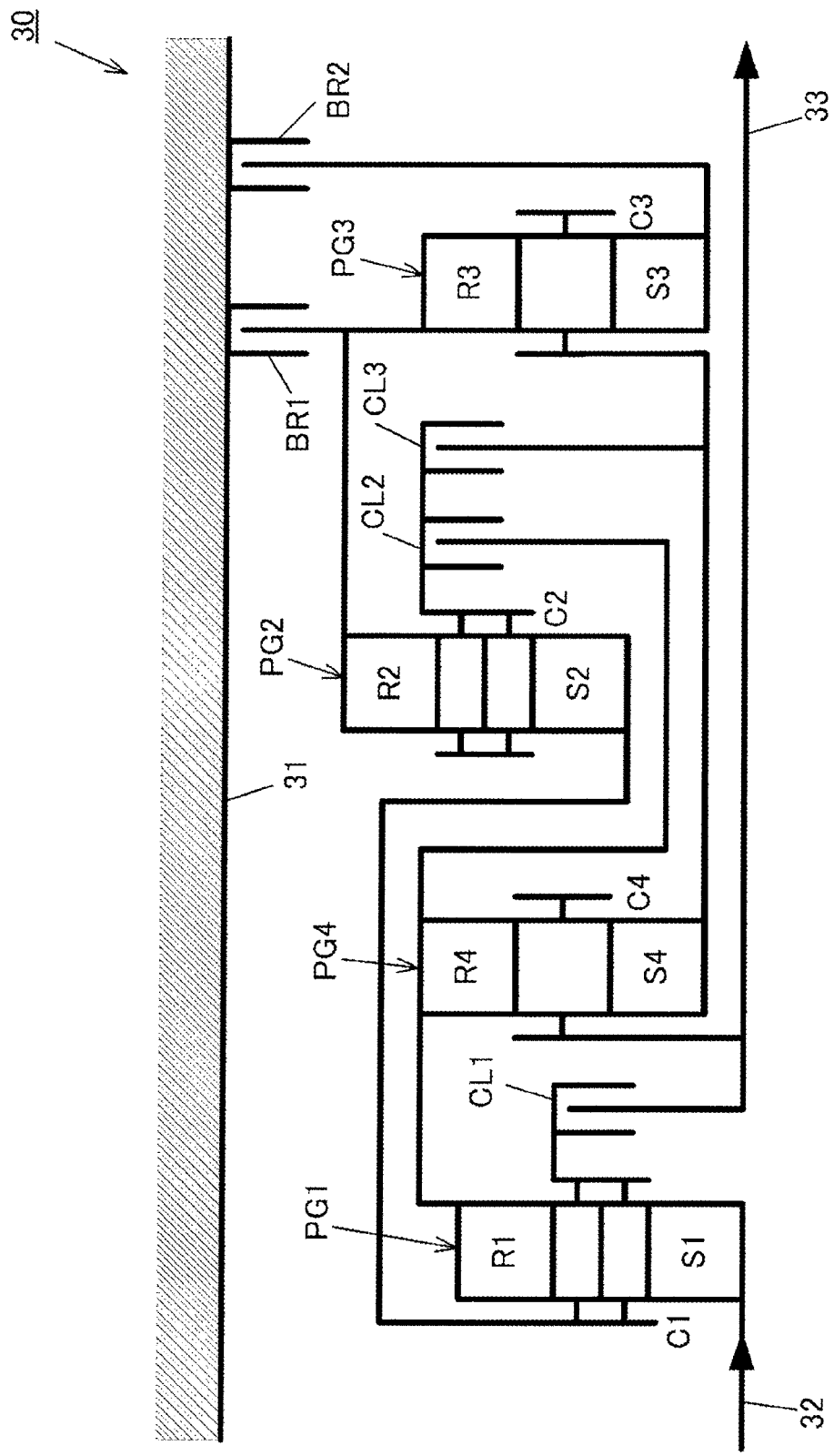
FIG. 13 is a schematic diagram showing the automatic transmission according to Embodiment 3.

In an automatic transmission 30 according to Embodiment 3 shown in FIG. 13, the first gear set PG1, the fourth gear set PG4, the second gear set PG2, and the third gear set PG3 are provided on the axes of input and output shafts 32 and 33 in this order from the input side.

Further, the first clutch CL1 is provided between the first gear set PG1 and the fourth gear set PG4. The second clutch CL2 and the third clutch CL3 are provided between the second gear set PG2 and the third gear set PG3 in this order from the input side. The first brake BR1 and the second brake BR2 are provided near the third gear set PG3 in this order from the input side.

Figure 14:
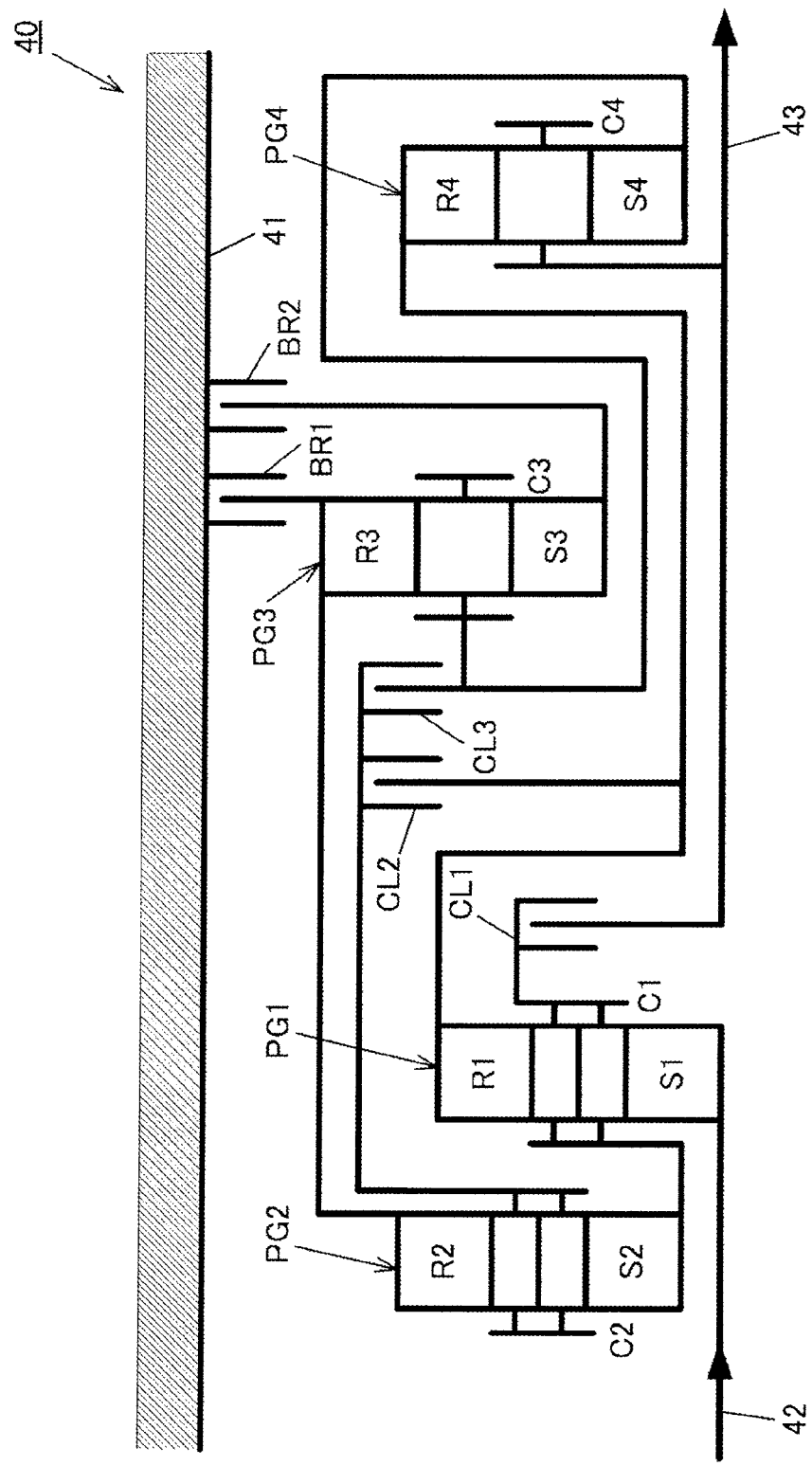
FIG. 14 is a schematic diagram showing the automatic transmission according to Embodiment 4.

In an automatic transmission 40 according to Embodiment 4 shown in FIG. 14, the second gear set PG2, the first gear set PG1, the third gear set PG3, and the fourth gear set PG4 are provided on the axes of input and output shafts 42 and 43 in this order from the input side.

Further, the first clutch CL1, the second clutch CL2, and the third clutch CL3 are provided between the first gear set PG1 and the third gear set PG3 in this order from the input side. The first brake BR1 and the second brake BR2 are provided near the third gear set PG3 in this order from the input side.

Figure 15:
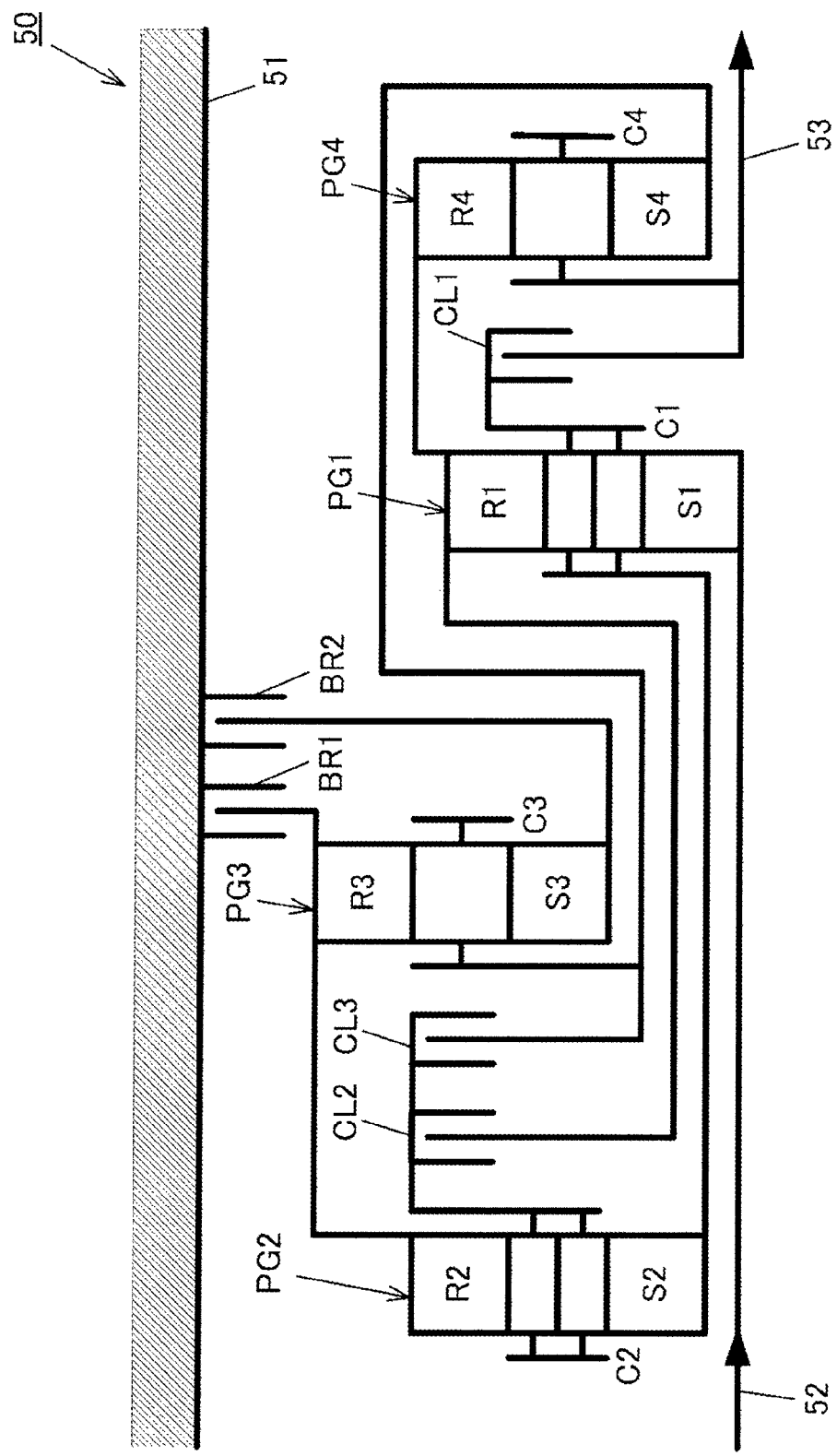
FIG. 15 is a schematic diagram showing the automatic transmission according to Embodiment 5.

In an automatic transmission 50 according to Embodiment 5 shown in FIG. 15, the second gear set PG2, the third gear set PG3, the first gear set PG1, and the fourth gear set PG4 are provided on the axes of input and output shafts 52 and 53 in this order from the input side.

Further, the second clutch CL2 and the third clutch CL3 are provided between the second gear set PG1 and the third gear set PG3 in this order from the input side. The first clutch CL1 is provided between the first gear set PG1 and the fourth gear set PG4. The first brake BR1 and the second brake BR2 are provided near the third gear set PG3 in this order from the input side.

Figure 16:
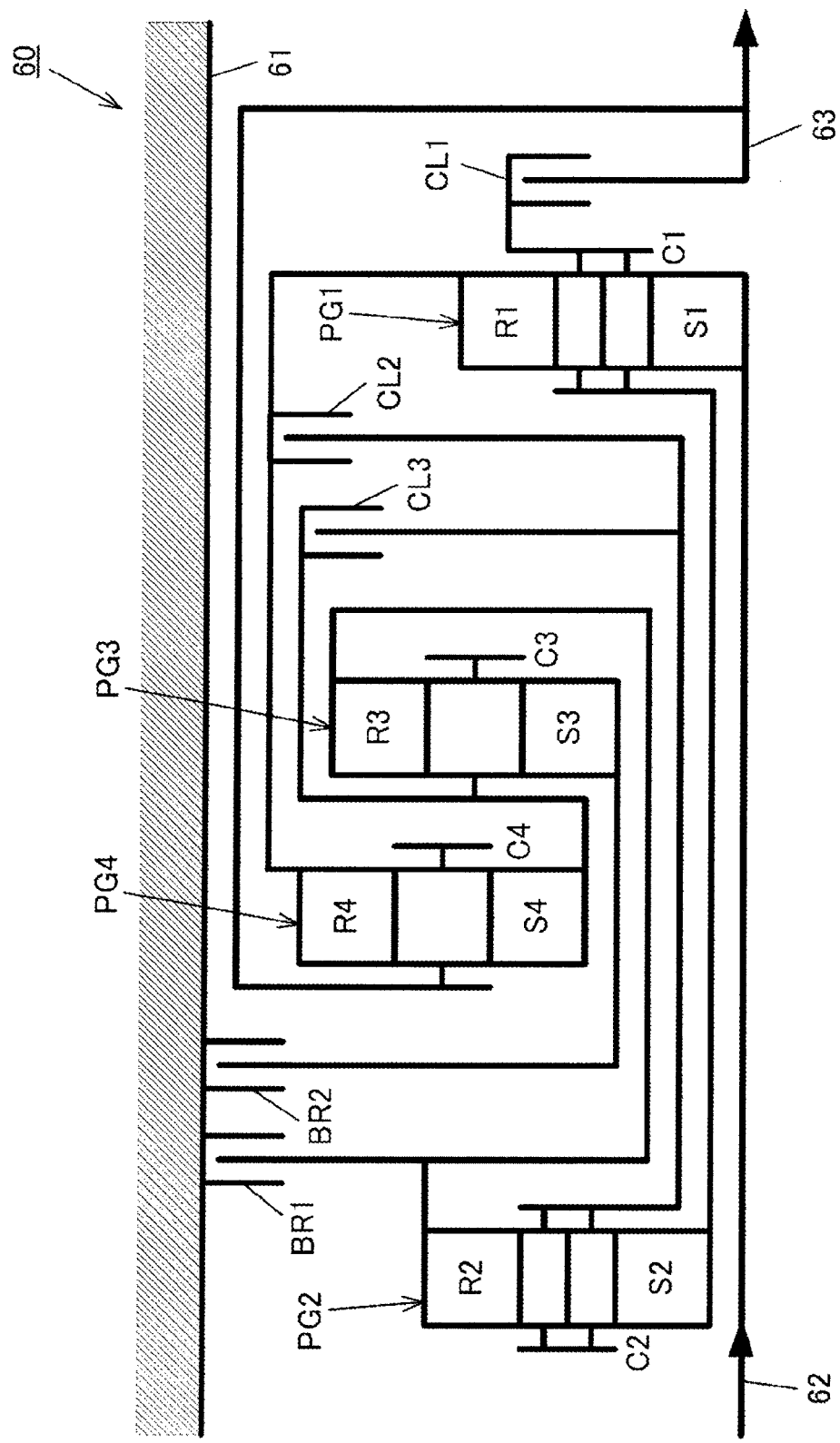
FIG. 16 is a schematic diagram showing the automatic transmission according to Embodiment 6.

In an automatic transmission 60 according to Embodiment 6 shown in FIG. 16, the second gear set PG2, the fourth gear set PG4, the third gear set PG3, and the first gear set PG1 are provided on the axes of input and output shafts 62 and 63 in this order from the input side.

Further, the third clutch CL3 and the second clutch CL2 are provided between the third gear set PG3 and the first gear set PG1 in this order from the input side. The first clutch CL1 is provided at an output side of the first gear set PG1. The first brake BR1 and the second brake BR2 are provided near the second gear set PG2 in this order from the input side.

As above, among the automatic transmissions 20 to 60 according to Embodiments 2 to 6 and the automatic transmission according to Embodiment 1, the order of arrangement of the first to fourth gear sets PG1 to PG4 on the axes of the input and output shafts and the positions of the friction engaging elements CL1 to CL3, BR1, and BR2 are different. However, other configurations of the automatic transmissions 20 to 60 according to Embodiments 2 to 6 are the same as those according to Embodiment 1. The other configurations denote connection relations of the rotational elements (such as the sun gears, the ring gears, and the carriers) of the gear sets PG1 to PG4 and relations of the rotational elements which are connected to and disconnected from the transmission case by the brake or connected to and disconnected from each other by the clutch.

To be specific, in each of the automatic transmissions 20 to 60 according to Embodiments 2 to 6, the first ring gear R1 and the fourth ring gear R4 are constantly connected to each other, and the first carrier C1 and the second sun gear S2 are constantly connected to each other. Further, the second ring gear R2 and the third ring gear R3 are constantly connected to each other, and the third carrier C3 and the fourth sun gear S4 are constantly connected to each other. In addition, each of the input shafts 22 to 62 is constantly connected to the first sun gear S1, and each of the output shafts 23 to 63 is constantly connected to the fourth carrier C4.

The first clutch CL1 is provided between the first carrier C1 and a group consisting of the fourth carrier C4 and one of the output shafts 23 to 63, and connects and disconnects the first carrier C1 to and from the group consisting of the fourth carrier C4 and one of the output shafts 23 to 63. The second clutch CL2 is provided between the second carrier C2 and a group consisting of the first ring gear R1 and the fourth ring gear R4, and connects and disconnects the second carrier C2 to and from the group consisting of the first ring gear R1 and the fourth ring gear R4. The third clutch CL3 is provided between the second carrier C2 and a group consisting of the third carrier C3 and the fourth sun gear S4, and connects and disconnects the second carrier C2 to and from the group consisting of the third carrier C3 and the fourth sun gear S4.

Further, the first brake BR1 is provided between one of the transmission cases 21 to 61 and a group consisting of the second ring gear R2 and the third ring gear R3, and connects and disconnects one of the transmission cases 21 to 61 to and from the group consisting of the second ring gear R2 and the third ring gear R3. The second brake BR2 is provided between one of the transmission cases 21 to 61 and the third sun gear S3, and connects and disconnects one of the transmission cases 21 to 61 to and from the third sun gear S3.

Therefore, in each of the automatic transmissions 20 to 60 according to Embodiments 2 to 6, as with the automatic transmission 10 according to Embodiment 1, eight forward gear stages and one reverse gear stage are formed by selectively engaging three friction engaging elements in accordance with the table shown in FIGS. 2A and 2B, and the eighth gear stage is the directly coupled gear stage.

When the numbers of teeth of the gears of the first to fourth gear sets PG1 to PG4 are set as shown in FIG. 17 for example, the reduction ratios of the gear stages and the gear steps between the adjacent forward gear stages are set as shown in FIG. 18.

Figure 19:
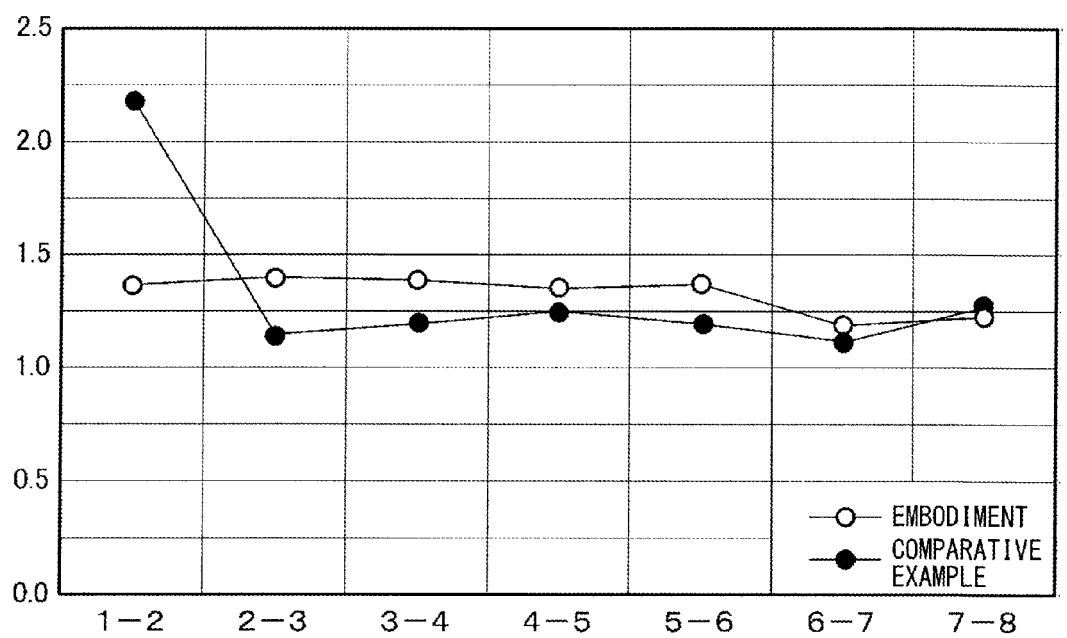
FIG. 19 is a graph showing the gear steps of FIG. 18 and gear steps of Comparative Example.

As shown in FIG. 19, the distribution of the above gear steps is compared with the distribution of the gear steps of the automatic transmission described in PTL 2 in which the directly coupled gear stage is the fifth gear stage. In PTL 2, the reduction ratio of the first gear stage is set to be relatively high. As a result, the gear step between the first and second gear stages is extremely higher than the other gear steps. On the other hand, in each of the automatic transmissions 10 to 60 according to the embodiments of the present invention, the gear steps fall within a narrow range of 1.1 to 1.4. Thus, the extremely equalized distribution of the gear steps is realized.

Each of the automatic transmissions 10 to 60 according to Embodiments 1 to 6 is a longitudinally mounted type automatic transmission for, for example, front engine rear drive vehicles in which the input and output shafts are provided on the same axis. However, a transversely mounted type automatic transmission for, for example, front engine front drive vehicles can be configured by the same configuration as above regarding the gear sets and the friction engaging elements.

Figure 20:
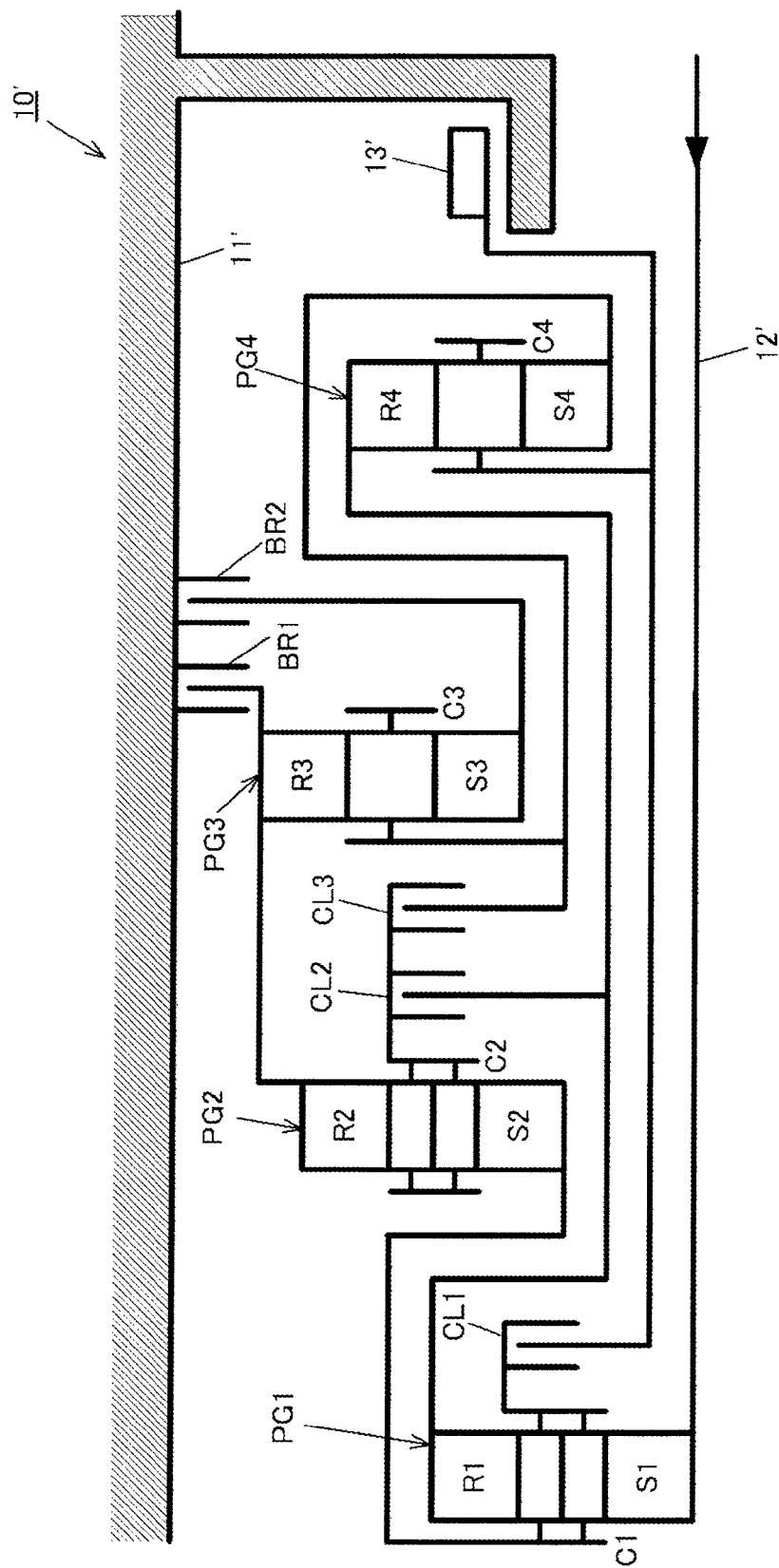
FIG. 20 is a schematic diagram showing the automatic transmission according to a Modified Example of Embodiment 1.

This will be explained below by using the automatic transmission 10 of Embodiment 1 as an example. As shown in FIG. 20, in a transversely mounted type automatic transmission 10' obtained by converting the longitudinally mounted type automatic transmission 10, the input side (driving source side) is a side (right side in FIG. 20) that is the same as the output side of the longitudinally mounted type automatic transmission 10, and an input shaft 12' connected to the driving source extends from the right side to a left side in FIG. 20 to be connected to the first sun gear S1.

Further, an output gear 13' is provided at the input side in the automatic transmission 10' instead of the output shaft 13 in the longitudinally mounted type automatic transmission 10. As with the output shaft 13, the output gear 13' is connected to the fourth carrier C4. The other configuration of the automatic transmission 10' is the same as that of the longitudinally mounted type automatic transmission 10.

Although not shown, the output gear 13' is connected to an input gear of a differential mechanism through a gear of a counter shaft, the differential mechanism being integrated with the automatic transmission 10'. A final reducer is constituted by a gear train including the output gear 13', the input gear, and components between the output gear 13' and the input gear.

Regarding the above, the same is true for the longitudinally mounted type automatic transmissions 20 to 60 according to Embodiments 2 to 6. Each of the automatic transmissions 20 to 60 can be converted into a transversely mounted type automatic transmission in the same manner as above.

INDUSTRIAL APPLICABILITY

As above, the present invention realizes the automatic transmission which realizes eight forward gear stages and in which: the directly coupled gear stage can be set to the eighth gear stage; and the gear steps between the gear stages can be appropriately set. Thus, the present invention may be suitably utilized in the technical field of manufacture of automatic transmissions for vehicles and in the technical field of manufacture of vehicles.

LIST OF REFERENCE CHARACTERS 10 to 60, 10' automatic transmission
11 to 61, 11' transmission case
12 to 62, 12' input shaft
13 to 63 output shaft
13' output gear
PG1 to PG4 first to fourth planetary gear sets
S1 to S4 sun gear
R1 to R4 ring gear
C1 to C4 carrier
CL1 to CL3 first to third clutches
BR1, BR2 first and second brakes

The invention claimed is:

1. An automatic transmission comprising, in a transmission case:
an input shaft connected to a driving source;
an output member provided coaxially with the input shaft and connected to a differential mechanism;
a double pinion type first planetary gear set including a first sun gear, a first ring gear, and a first carrier;
a double pinion type second planetary gear set including a second sun gear, a second ring gear, and a second carrier;
a single pinion type third planetary gear set including a third sun gear, a third ring gear, and a third carrier;
a single pinion type fourth planetary gear set including a fourth sun gear, a fourth ring gear, and a fourth carrier;
first, second, and third clutches; and
first and second brakes, wherein:
the input shaft and the first sun gear are constantly connected to each other;
the output member and the fourth carrier are constantly connected to each other;
the first ring gear and the fourth ring gear are constantly connected to each other;
the first carrier and the second sun gear are constantly connected to each other;
the second ring gear and the third ring gear are constantly connected to each other;
the third carrier and the fourth sun gear are constantly connected to each other;
the first clutch connects and disconnects the first carrier to and from a group consisting of the fourth carrier and the output member;
the second clutch connects and disconnects the second carrier to and from a group consisting of the first ring gear and the fourth ring gear;
the third clutch connects and disconnects the second carrier to and from a group consisting of the third carrier and the fourth sun gear;
the first brake connects and disconnects a group consisting of the second ring gear and the third ring gear to and from the transmission case;
the second brake connects and disconnects the third sun gear to and from the transmission case; and
when the first, second, and third clutches are engaged, and the first and second brakes are released, an eighth gear stage whose reduction ratio is 1 is formed.

2. The automatic transmission according to claim 1, wherein among the first, second, and third clutches and the first and second brakes:
when the second clutch, the first brake, and the second brake are engaged, a first gear stage is formed;
when the second clutch, the third clutch, and the first brake are engaged, a second gear stage is formed;
when the third clutch, the first brake, and the second brake are engaged, a third gear stage is formed;
when the first clutch, the third clutch, and the first brake are engaged, a fourth gear stage is formed;
when the first clutch, the first brake, and the second brake are engaged, a fifth gear stage is formed;
when the first clutch, the third clutch, and the second brake are engaged, a sixth gear stage is formed;
the first clutch, the second clutch, and the second brake are engaged, a seventh gear stage is formed; and
when the first clutch, the second clutch, and the first brake are engaged, a reverse gear stage is formed.

* * * * *